United States Patent [19]

Gabilondo

[11] Patent Number: 4,621,543
[45] Date of Patent: Nov. 11, 1986

[54] PLANETARY TORQUE CONVERTER

[75] Inventor: Francisco Legorburu Gabilondo, Guipuzcoa, Spain

[73] Assignee: Goizper S. Coop., Guizpuzcoa, Spain

[21] Appl. No.: 590,859

[22] Filed: Mar. 19, 1984

[30] Foreign Application Priority Data

Mar. 18, 1983 [ES] Spain .................................. 270985
Mar. 6, 1984 [ES] Spain .................................. 277971

[51] Int. Cl.$^4$ .......................... F16H 1/32; F16H 1/28
[52] U.S. Cl. .................................. 74/805; 74/785; 74/801; 74/804
[58] Field of Search ............... 74/804, 805, 785, 788, 74/801

[56] References Cited

U.S. PATENT DOCUMENTS

| | | | |
|---|---|---|---|
| 2,783,662 | 3/1957 | Schneider | 74/805 |
| 3,129,611 | 4/1964 | Lee | 74/804 |
| 3,324,744 | 6/1967 | Roper | 74/711 |
| 3,472,097 | 10/1969 | Huska | 74/805 X |
| 3,534,636 | 10/1970 | Lorence | 74/805 |
| 3,965,774 | 6/1976 | Omi et al. | 74/805 |
| 3,998,112 | 12/1976 | Pierrat | 74/805 |
| 4,023,440 | 5/1977 | Kennington et al. | 74/805 X |
| 4,262,556 | 4/1981 | Hart | 74/805 |
| 4,271,726 | 6/1981 | Ryffel | 74/805 |
| 4,407,170 | 10/1983 | Fukui | 74/805 |

FOREIGN PATENT DOCUMENTS

| | | | |
|---|---|---|---|
| 1958635 | 6/1970 | Fed. Rep. of Germany | 74/804 |
| 2503908 | 8/1975 | Fed. Rep. of Germany | 74/804 |
| 769148 | 10/1980 | U.S.S.R. | 74/804 |

Primary Examiner—Kenneth J. Dorner
Assistant Examiner—Dwight G. Diehl
Attorney, Agent, or Firm—Abelman Rezac Frayne & Schwab

[57] ABSTRACT

One planet wheel of each pair of planet wheels of a double reduction torque converter is positioned axially intermediate the or each other pair of planet wheels, in order that the unsupported length of the interconnecting gudgeon pins is reduced to the axial thickness of the or each planet wheel intermediate the said pairs of planet wheels.

4 Claims, 9 Drawing Figures

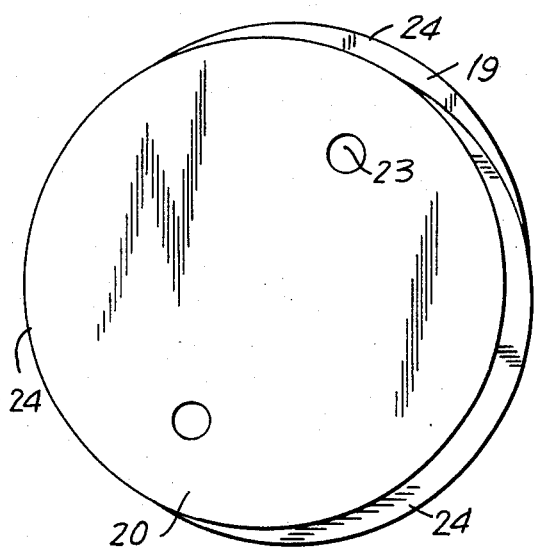
FIG. 3A
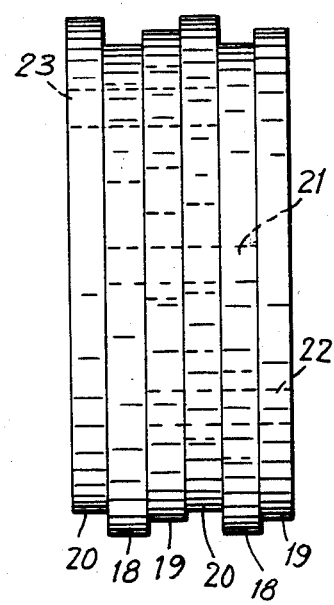
FIG. 3B
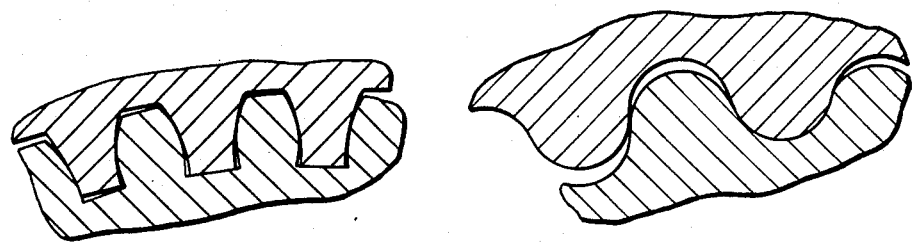
FIG. 4
FIG. 5
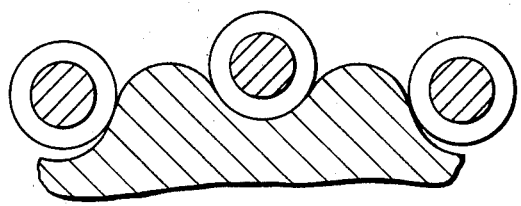
FIG. 6

4,621,543

PLANETARY TORQUE CONVERTER

FIELD OF THE INVENTION

This invention relates to a torque converter, i.e., to a speed reduction or speed increasing gearing of the coaxial planetary converter type.

BACKGROUND OF THE INVENTION

Coaxial planetary converters include an input shaft, which usually is the high speed shaft. Eccentrics are fixed on the input shaft, and carry bearings on which planet wheels are mounted. The planet wheels in turn mesh with a ring gear carried by a fixed housing, and with a ring gear carried by the output shaft.

Conventional torque converters are encumbered with two major problems, one being that strong radial loads are produced at the contact point of the eccentrics with their associated ring gears, which must be absorbed by the support bearings of the input and output shafts. Another problem is that the rotation of eccentric masses produces strong vibrations.

SUMMARY OF THE INVENTION

The converter which the invention proposes has for its object the distribution of the said radial loads, with a concommitant reduction in vibration produced within the converter.

According to one embodiment of the present invention a planet wheel is mounted on a first eccentric fast with the input shaft, and is engaged with a ring gear carried by a housing and the ring gear carried by the output shaft.

Complementary second and third planet wheels are provided on each side of the main planet wheel, and are mounted on respective second and third eccentrics having their major radios opposite the major radius of the first eccentric. The second and third planet wheels are joined to each other by gudgeon pins extending parallel to the axis of the input and output shafts. The gudgeon pins are rigidly fixed to the second and third planet wheels, and extend through apertures in the first planet wheel of sufficient exent to permit transversal displacement of the gudgeon pins arising from the different eccentricities.

The first and second planet wheels are meshed with the ring gear carried by the housing, but at diametrically opposed points. The first and third planet wheels are meshed with the ring gear carried by the output shaft also at diametrically opposed points. In this manner, the problems inherent in conventional converters are simultaneously solved, as the radial forces are counteracted and the vibrations thus are counter balanced and disappear.

According to another embodiment of the present invention, additional planet wheels are provided, respectively mounted on eccentrics arranged at an angle of 120° relative to each other. In this manner, the radial loads are distributed perimetrically at three equidistant points, further reducing vibrations. In the same manner, the loads can be distributed at four or more equidistant points perimetrically of the converter by increasing the number of planet wheels used for the input and output. In all instances, the rigid connection between the respective sets of planet wheels is maintained.

Instead of using gearing having conventional gear teeth, the respective drives can be provided by an arrangement of freely rotating rollers cooperating with sinusoidal lobes on the respective planet wheels.

In each of the above embodiments, thrust supplied to the respective eccentrics divides into two components. One is a tangential useful force which produces the drive, and the other is a completely parasitic radial component, which has to be absorbed by the eccentrics.

In accordance with another feature of the invention, the perimetric alignment of rollers is assisted by a ring which is mounted peripherally of the respective set of rollers and which turns freely when driven by the latter, i.e., one ring is provided for the sets of rollers carried by the housing, and a second ring is provided for the sets of rollers carried by the output shaft.

In accordance with this layout, the diametrically opposed stresses are balanced, giving a zero component.

DESCRIPTION OF THE DRAWINGS

The invention will now be described with reference to the accompanying drawings, which illustrate preferred embodiments of the present invention, and in which:

FIG. 3 is a front and side schematic illustrations of a planetary wheel unit in which the axial loads are distributed at three equidistant points about the periphery of the assembly;

FIGS. 4, 5 and 6 show alternative manners of providing meshing between the planetary wheels and the housing or the output shaft;

DESCRIPTION OF THE PREFERRED EMBODIMENT

Figure 1:
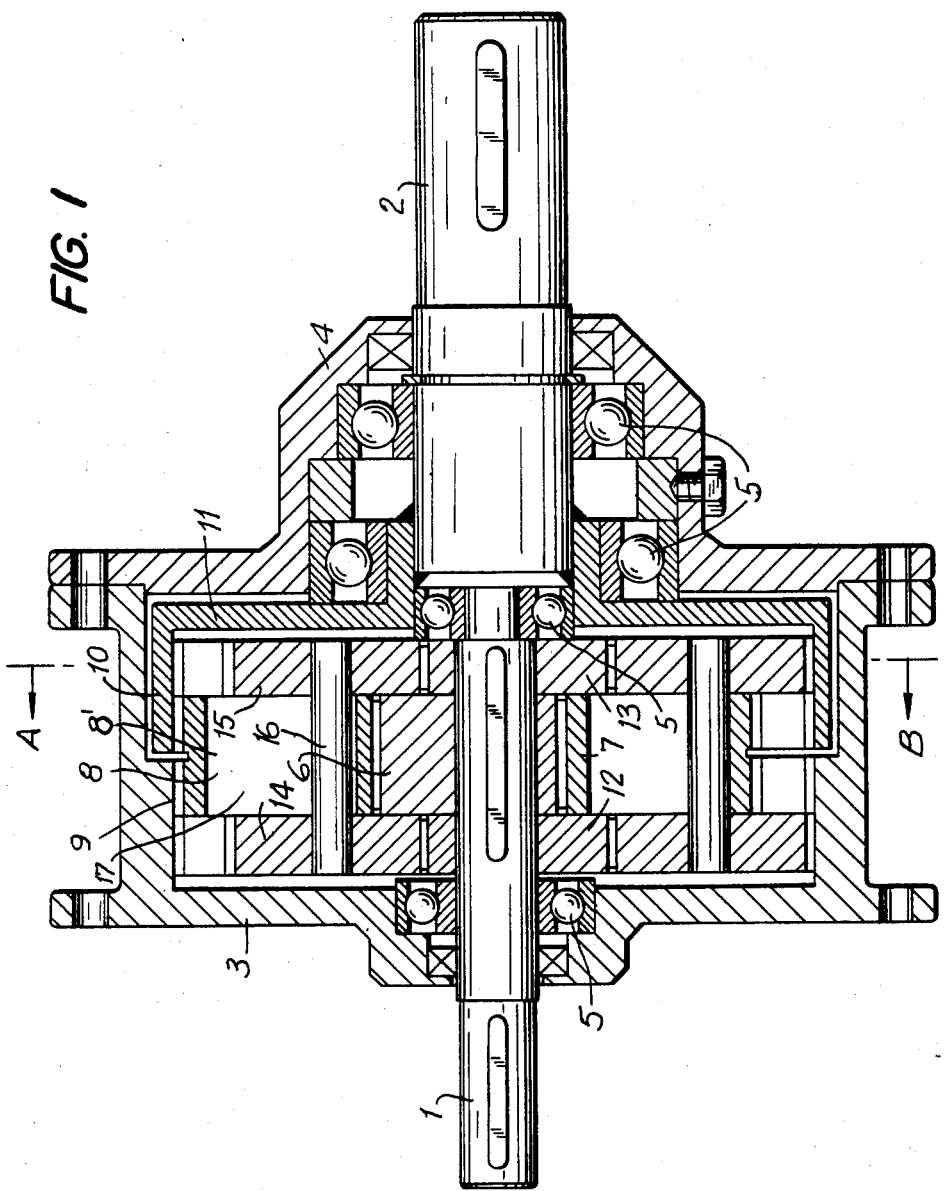
FIG. 1 is a diametrical section of one embodiment of a balanced planetary torque converter according to the present invention.
Figure 7:
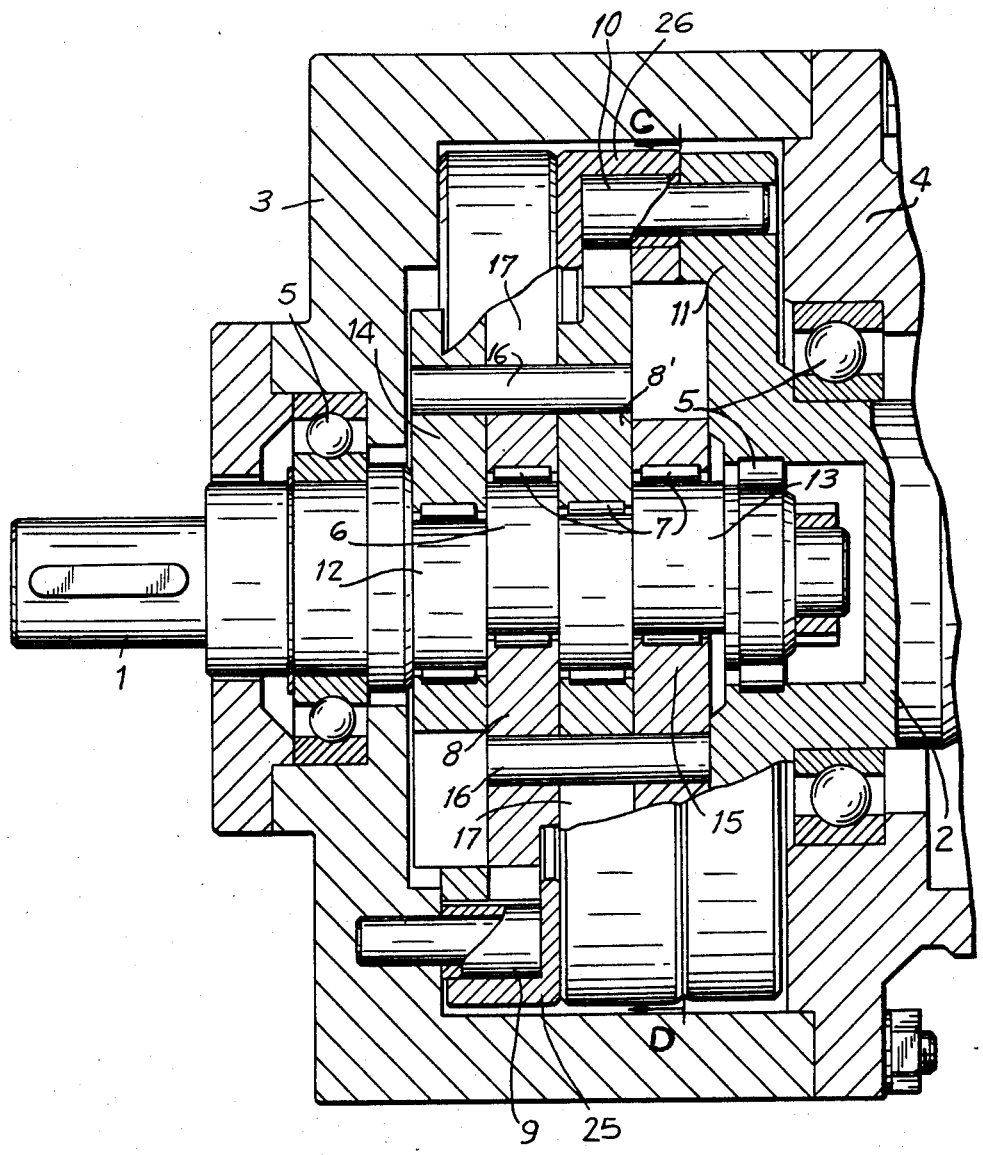
FIG. 7 is a cross-section of an alternative embodiment of torque converter according to the present invention.
Figure 9:
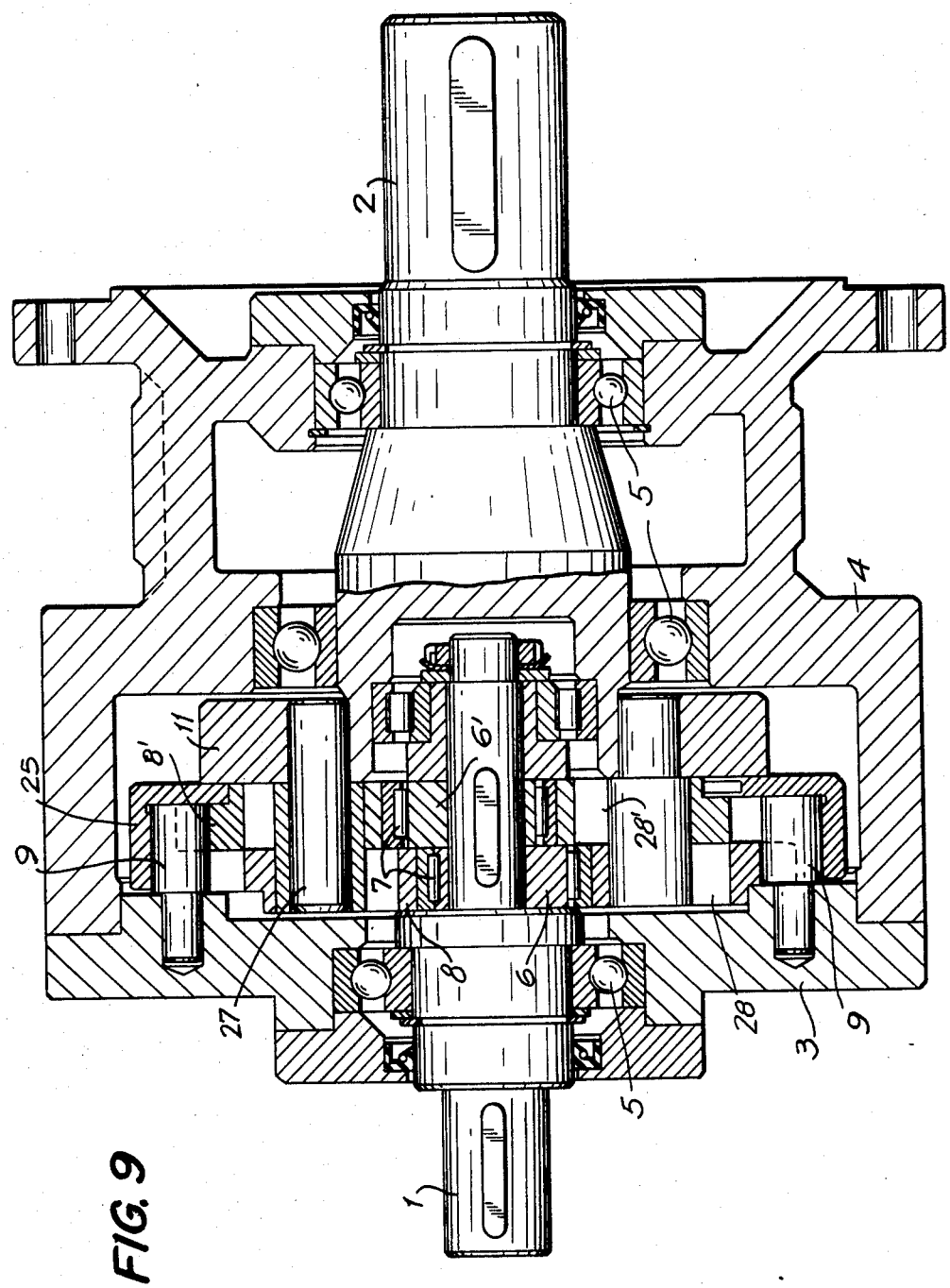
FIG. 9 is a cross-section, through a further embodiment of torque converter according to the present invention.

In each of the embodiments of FIGS. 1, 7 and 9, and their related figures, the torque converter includes an input shaft 1 and an output shaft 2 installed coaxially within a fixed housing including a body 3 and a closure 4, and supported by bearings 5.

The input shaft 1 supports a first eccentric 6 on which planet wheels 8 and 8' are mounted by bearings 7. Optionally the planet wheels comprise a single wheel. Planet wheel 8' meshes with a ring gear 9 in the inner side of the body 3. Planet wheel 8 meshes with a ring gear 10 in the inner side of a carrier 11 secured to the output shaft 2, as can be seen in FIG. 1.

The rings gears 9 and 10 and the planet wheel 8, 8' can be of the toothed type type illustrated in FIG. 4, or the cycloidal type illustrated in FIG. 5, or, cycloidal with rotatable rollers as shown in FIG. 6.

Figure 2:
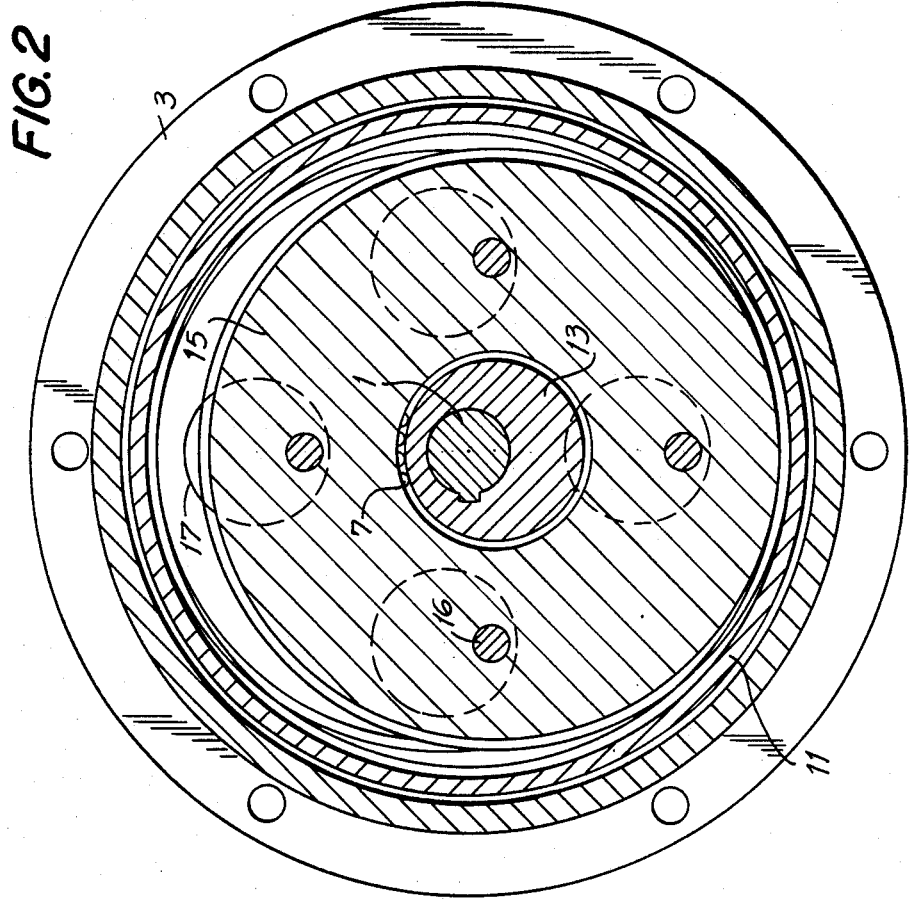
FIG. 2 is a cross-section on the line A/B of FIG. 1.

Referring now particularly to FIGS. 1 and 2, on each side of the first eccentric 6 are second and third eccentrics 12 and 13, of identical but opposite eccentricity to that of eccentric 6. The eccentrics 12 and 13 support respective second and third planet wheels 14 and 15, which engage the ring gears and 9 and 10, respectively, at a position diametrically opposite the planet wheels 8 and 8'.

Since the second and third planetary wheels 14 and 15 must move in unison, they are joined by pins 16 extending parallel to the input shaft 1 and which extend through apertures 17 in the first planet wheel 8, 8'. The apertures 17 are considerably larger in diameter than that of the pins 16, in order to allow relative radial displacements between the respective planet wheels. The pins 16 can be cylindrical or of any other cross-section, as is the case with the holes 17 through which they pass.

In this manner, the radial loads exerted on the respective planet wheels and eccentrics are produced simultaneously at two diametrically opposing points, thus counteracting both loads while at the same time minimizing vibrations by virtue of the balancing of the rotating the eccentric masses.

Additionally, the converter torque capability is increased as a consequence of the multiple planet wheels, in this case four.

As illustrated in FIGS. 3A and 3B, the number of planet wheels maybe increased to three pairs. In FIG. 3B, one pair of planet wheels 18 is positioned between a pair of planet wheels 9, and between a pair of planet wheels 20. Each pair of planet wheels is joined by pins 21, 22 or 23, which pass through large diameter holes in the intermediae planet wheels. By this construction three contact points 24 spaced equally about the converter periphery are provided, thereby improving the distribution of the radial loads. The weight distribution of the eccentric masses is also improved, and vibration is reduced even further, and the torque capability of the converter is further increased.

The converter of FIG. 7 differs from the one in FIG. 1 in that the first planet wheels 8 and 8' and the second and third planet wheels 14 and 15 are in an alternated arrangement. Also the respective planet wheels have a cycloidal profile and are coupled with respective perimetric sets of rollers 9 and 10, in substitution of the gears of FIG. 1.

Figure 8:
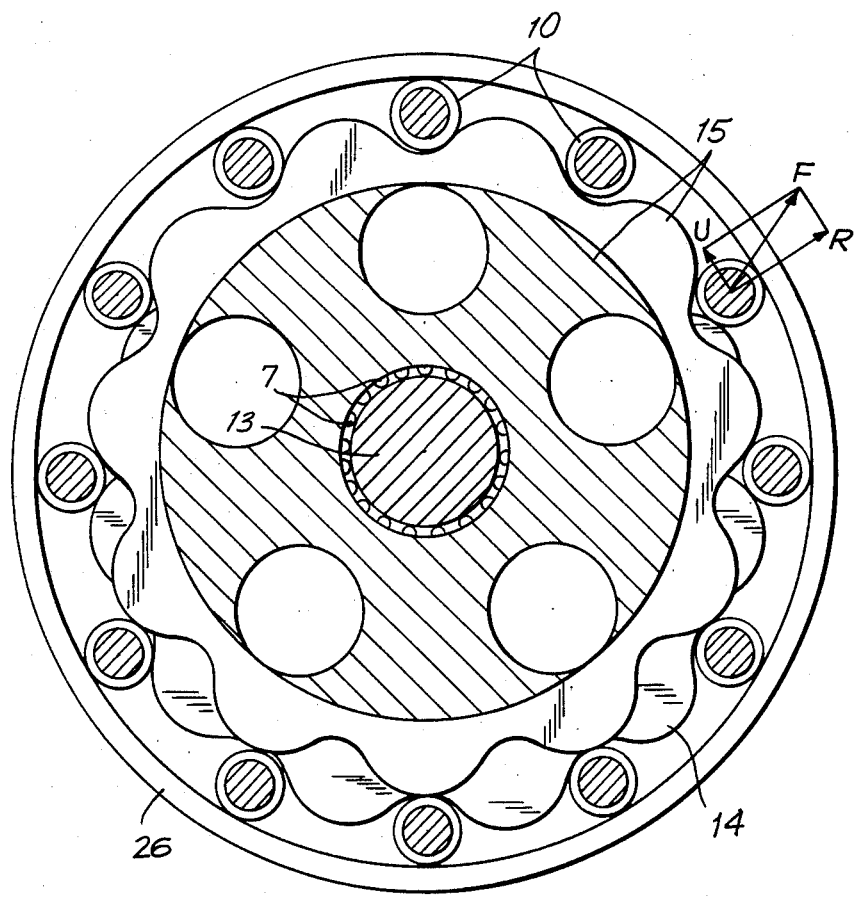
FIG. 8 is a cross-section of the converter of FIG. 7, taken on the line C/D of that Figure.

Rings 25 and 26 are provided to absorb the radial component R (FIG. 8) resulting from the force F applied to the rollers 9 and 10 by the respective cycloidal wheels 8 and 8'. This force F is the resultant of the aforementioned radial parasitic component R and the tangential component U.

In accordance with the foregoing, the rollers are rotated simultaneously by the action of the respective cycloidal wheels, and in turn rotate the rings 25 and 26.

The feature is also applicable to a simple reduction converter, such as the one illustrated in FIG. 9.

In FIG. 9, the input shaft 1 includes two eccentrics 6 and 6', on which two cycloidal planet wheels 8 and 8' are mounted by bearings 7. The respective planet wheels engage a single set of rollers 9, carried by the body 3.

The tilting rotational movement of the planet wheels is transmitted to the output shaft 2 through a second set of rollers 27, similar to the previous ones. The shanks of the rollers are connected to the plate 11 fast with the output shaft. The rollers 27 extend into cylindrical windows 28 and 28', respectively in the wheels 6 and 6'.

In this embodiment also, the rollers 9 are provided with an outer surrounding ring 25, to which the radial components of the stresses are transmitted.

I claim:

1. In a double reduction torque converter of the type having:
   a pair of first drive planets interconnected by gudgeon pins for movement in unison with each other, and respectively reacting against a fixed casing of the converter and a rotatable carrier fast with an output shaft of the converter, and,
   a pair of second drive planets interconnected with each other by gudgeon pins for movement in unison with each other, said second drive planets being angularly displaced from said first drive planets and also reacting respectively against said fixed casing of said converter and a rotatable carrier fast with said output shaft of the converter,
   each of said first and second drive planets being mounted on eccentrics fast with an input shaft:
   the improvement comprising:
   one of said second drive planets being positioned axially intermediate said first drive planets;
   one of said first drive planets being positioned axially intermediate said second drive planets;
   said gudgeon pins extending through apertures in said axially intermediate drive planets;
   whereby the axial length of said gudgeon pins respectively interconnecting said first drive planets and said second drive planets is reduced to the distance between the outer surfaces of said first and second drive planets.

2. The double reduction torque converter of claim 1, in which said first and second drive planets are displaced angularly from each other by 180°.

3. The double reduction torque converter of claim 1, further including at least one additional pair of drive planets interconnected with each other by gudgeon pins for movement in unison:
   one each of said pairs of first and second planets being positioned axially intermediate said additional pair of drive planets, whereby the axial length of the gudgeon pins interconnecting the respective first, second and additional pairs of planets is reduced to the thickness of said two axially intermediate planets.

4. The double reduction torque converter of claim 3, in which said respective first, second and additional pairs of planets are displaced angularly from each other by an angle of 360° divided by the number of pairs of said planets.

* * * * *